United States Patent [19]

Chentemirov et al.

[11] 4,241,138

[45] Dec. 23, 1980

[54] POROUS HEAT-INSULATION MATERIAL

[76] Inventors: Minas G. Chentemirov, ulitsa Vorovskogo, 29/31, kv. 14; Ekaterina P. Lukienko, ulitsa Molodogvardeiskaya, 6, kv. 95; Levon O. Parsamian, Volgogradsky prospekt, 127, korpus 2, kv. 29; Anatoly F. Poluyanov, ulitsa Vavilova, 86, kv. 117; Jury G. Gorbachev, ulitsa Oktyabrskaya, 4, kv. 4; Nikolai S. Enikolopov, Kutuzovsky prospekt, 26, kv. 245; Fridrikh S. Dyachkovsky, Vorobievskoe shosse, 2-b, kv. 9; Ljudmila A. Novokshonova, ulitsa 26 Bakinskikh komissarov, 7, korpus 4, kv. 38; Jury A. Gavrilov, Chistoprudny bulvar, 14, kv. 57, all of Moscow; Olga I. Kudinova, ulitsa Malakhovskaya, 15, poselok Kratovo Moskovskoi oblasti; Tatyana A. Maklakova, Leningradskoe shosse, 8/2, kv. 200, Moscow, all of U.S.S.R.

[21] Appl. No.: 955,571

[22] Filed: Oct. 30, 1978

[51] Int. Cl.² .................... B32B 19/04; B32B 27/06; B32B 27/14; C04B 43/00
[52] U.S. Cl. .................................... 428/403; 252/62; 428/407

[58] Field of Search ............... 428/403, 407, 338; 252/62

[56] References Cited

U.S. PATENT DOCUMENTS

| | | | |
|---|---|---|---|
| 3,104,196 | 9/1963 | Shannon | 428/407 |
| 3,551,274 | 12/1970 | Shannon | 428/338 |
| 3,655,564 | 4/1972 | Barrington | 252/62 |
| 4,066,539 | 1/1978 | Hachisu et al. | 428/407 X |
| 4,107,376 | 8/1978 | Ishikawa | 428/407 X |

*Primary Examiner*—Thomas J. Herbert, Jr.
*Attorney, Agent, or Firm*—Fleit & Jacobson

[57] ABSTRACT

A porous heat-insulation material comprising blocks molded from granules of a porous mineral filler with a polyolefin coating. The coating thickness is 1/1000 to 1/25 of the average granule diameter; in contact regions, said granules are spaced from each other at a distance of from 0.5 to 2.0 of the coating thickness, and the mass ratio between said porous mineral filler and said polyolefin is 80–98:20–2, respectively. The material of this invention has a volume mass of from 60 to 250 kg/m³. The material features a high plasticity (its flexural strength is as high as 3–4 kgf/cm²). The compression strength of the material is 9–12 kgf/cm². The material also has a low thermal conductivity; its thermal conductivity coefficient is 0.03–0.04 kcal/m.hr.°C. The material is substantially non-combustible.

3 Claims, No Drawings

POROUS HEAT-INSULATION MATERIAL

FIELD OF THE INVENTION

The present invention relates to construction insulating materials and, more particularly, to porous heat-insulation materials produced from granules of a mineral porous filler with a polymeric coating. Said porous heat-insulation materials may be used for thermal insulation of, for example, buildings or pipelines.

BACKGROUND OF THE INVENTION

Known in the art is a porous heat-insulation material comprising blocks moulded from granules of a foamed synthetic resin with a cement coating bonded with each other by means of a cement-like binder (cf. U.S. Pat. No. 3,104,196 Cl. 161–168, 1963).

This prior art porous heat-insulation material has a high volume mass (320 to 350 kg/m$^3$), low porosity and, consequently, an increased thermal conductivity. Furthermore, this material contains a large amount of the binder (ratio between masses of the synthetic resin and cement-like binder is equal to 1:0.4 to 1.6). This material also features a low plasticity.

Known in the art is a porous heat-insulation material comprising blocks moulded from granules of expanded perlite sand with a thermoplastic (asphalt resin) coating bonded together by means of a hydrophobic binder, i.e. pitch (cf. U.S. Pat. No. 3,655,564 Cl. 252–378, 1972).

This prior art material has disadvantages reading in its creep at elevated temperatures (70° to 100° C.), a high content of the binder (up to 60% by mass). Volume mass of said material is 300 kg/m$^3$ and above. Furthermore, this material is combustible.

Also known in the art is a heat-insulation material comprising blocks moulded from granules of foamed mineral filler (e.g. clay, glass) with a thermosetting polymeric coating (epoxy, phenol-formaldehyde, unsaturated polyester resins); voids between granules are at least partly filled with a foamed synthetic resin (cf. U.S. Pat. No. 3,551,274 C. 161–168, 1970).

This material, however, consists of large-size granules only (1.5 to 1.8 mm), therefore the possibility of using finely-divided mineral fillers is restricted. Said thermosetting coating is non-uniformly distributed over the surface of granules. The material has a low plasticity value. The content of said thermosetting polymer in the material is rather high, i.e. about 30% by mass. Volume mass of the material is also high (180–240 kg/m$^3$).

SUMMARY OF THE INVENTION

It is an object of the present invention to provide a porous heat-insulation material featuring a low volume mass, low content of the polymer and a high plasticity.

It is another object of the present invention to provide a substantially non-combustible material.

These and other objects of the present invention are accomplished by a porous heat-insulation material comprising blocks moulded from granules of a porous mineral filler with a polymeric coating; in accordance with the present invention as the material of the polymeric coating a polyolefin is used such as polyethylene, polypropylene or a copolymer of ethylene with propylene; the polymeric coating thickness is varied within the range of from 1/1000 to 1/25 of an average diameter of the granules; said granules are spaced from each other in the contact regions at a distance ranging from 0.5 to 2.0 times of the coating thickness and a mass ratio between said porous material filler and said polyolefin is equal to 80–98:20–2 respectively.

The porous heat-insulation material according to the present invention has a volume mass of from 60 to 250 kg/m$^3$. The polymeric coating is uniformly distributed over the entire surface of granules of the mineral filler. Owing to the use of a thermoplastic polymeric coating, said heat-insulation material features a high plasticity; its flexural strength [$\sigma_b$] is as high as 3–4 kgf/cm$^2$. Compression strength [$\sigma_c$] of said material is as high as 9–12 kgf/cm$^2$. A porous heat-insulation material containing 12% by mass and below of polyolefin is non-combustible, while a material containing 13 to 20% by mass of polyolefin is low-combustible. The material with the above-mentioned characteristics has a low thermal conductivity and its thermal conductivity coefficient is 0.03–0.04 kCal/m.hr.°C.

DETAILED DESCRIPTION OF THE INVENTION

The porous heat-insulation material according to the present invention may contain, as a porous mineral filler, various expanded mineral compounds such as expanded perlite sand, expanded vermiculite and naturally-occurring porous materials such as volcanic ash, pumice. The porous mineral filler employed in the material of the present invention may have a narrow (e.g. 150–350$\mu$, 500–1,000 mcm) or a wide (e.g. 10 to 3,000$\mu$) particle-size distribution.

As the material of said thermoplastic polymeric coating use may be made, in the heat-insulation porous material of the present invention, of polyethylene, polypropylene, copolymers of ethylene with propylene, polybutene, polymethylpentene and the like. The polymeric coating is uniformly distributed over the entire surface of the filler granules. Thickness of the polymeric coating is 1/1000 to 1/25 of an average diameter of the granules and the distance between granules in the contact regions is 0.5 to 2.0 of the coating thickness. Ratio between masses of the porous mineral filler and polyolefin in the porous heat-insulation material depends on the granulometric composition of the filler, nature thereof and thickness of the polymeric coating and is equal to 80–98:20–2 respectively.

Granules of the porous mineral filler with the polyolefin coating to be moulded into blocks are preliminary prepared by deposition, from a gas phase, of a complex organometallic catalyst consisting of a compound of a transition metal and an organic compound of a metal belonging to Group II or III of the periodic system, onto the surface of a porous mineral filler and polymerization of olefins from a gas phase at a temperature within the range of from 50° to 170° C. under a pressure of from 1 to 60 atm on said catalyst deposited onto the surface of the filler granules. The above-mentioned deposition of the catalyst is effected successively so that first deposited is the former of the above-indicated catalyst components, i.e. a compound of a transition metal such as vanadium tetrachloride, vanadium oxytrichloride, titanium tetrachloride, tungsten hexachloride, iron trichloride, and then the second component of the catalyst, i.e. an organic compound of a metal of Group II or III of the periodic system, such as diethylaluminium chloride, triethylaluminium, triisobutylaluminium, diethylzinc, diethylmagnesium.

Deposition of the catalyst components onto the surface of granules of said porous mineral filler may be effected in the above-described sequence prior to the polymerization process.

Also possible is such an embodiment, where deposition of the first component of the catalyst, ie. a compound of a transition metal, onto the surface of the filler granules is effected prior to polymerization, while deposition of the second component of the catalyst, i.e. an organic compound of a metal of Group II or III of the periodic system, is effected simultaneously with polymerization.

The above-described process makes it possible to obtain a high-quality polyolefin coating with an adjustable thickness (thickness is adjusted over a wide range of from 1/1000 to 1/25 of an average diameter of the granules) having a strong adherence to the surface of granules of said porous mineral filler. The process may be both continuous and periodic. This process makes it possible to produce an integral uniform coating which, in turn, enables production, by moulding of blocks porous heat-insulation material with required properties (volume mass, strength characteristics, thermal conductivity) at a minimal content of the polymer in the final material.

Moulding of blocks of said porous heat-insulation materials may be performed, for example, by way of random charging of granules with a thermoplastic polyolefin coating into a mould, followed by hot compression moulding at a temperature of from 100° to 200° C. under a pressure of up to 5 kgf/cm$^2$.

As it has been mentioned hereinabove, granules are spaced from each other, in the contact regions, at a distance of from 0.5 to 2.0 of the polymeric coating thickness. This distance may be adjusted, for example, by adjusting temperature, pressure and time of residence under pressure during hot-compression moulding.

The volume mass of the resulting blocks of a porous heat-insulation material varies from 60 to 250 kg/m$^3$. The block shape may be different and limited only by the existing types of moulding equipment for manufacture of blocks. Thus, blocks intended for insulation of roofs and walls are shaped as flat plates; blocks for insulation of pipes have the shape of tubular members or cylindrical shells; blocks for insulation of spherical surfaces have the shape of spherical shells.

For a better understanding of the present invention, the following specific Examples are given hereinbelow by way of illustration.

EXAMPLE 1

A porous mineral filler, viz, swollen perlite sand with a particles size of from 10 to 3,000$\mu$, the average granule diameter of 500$\mu$ and the volume mass of 60 kg/m$^3$ is preliminary dried at the temperature of 120° C. and charged into a metallic reactor in the amount of 5 kg. The reactor is set under vacuum and vapours of vanadium tetrachloride are admitted thereinto in the amount of 0.49 g; said vapours of vanadium tetrachloride are deposited on the surface of granules of expanded perlite sand. The latter sand with vanadium chloride deposited on its surface is charged into the reactor at the temperature of 80° C. and vapours of triisobutylaluminium (1.6 g) are fed thereinto and deposited on the surface of granules of the expanded perlite sand. Then into the reactor containing granules of said expanded perlite sand with the catalyst components deposited on its surface ethylene is admitted to the pressure of 2.1 atm and polymerization is performed from the gas phase at the temperature of 80° C. under agitation for 13 minutes. The yield of polyethylene is 680 g.

The thus-prepared product comprises granules of expanded perlite sand coated with polyethylene. The coating thickness is 1/50 of the average diameter of the expanded perlite sand granules.

The granules with the polymeric coating are charged into a mould and subjected to hot-compression moulding at the temperature of 140° C. under the pressure of 1 kgf/cm$^2$. The time of residence under pressure is 15 minutes.

On completion of the compression-moulding process, pressure is released, the mould is cooled to a temperature of from 20° to 30° C. and the resulting porous heat-insulation material is discharged from the mould in the form of a block moulded from granules of expanded perlite sand with polyethylene coating. The thickness of the polyethylene coating on said granules is equal to 1/50 of the average diameter of granules of said expanded perlite sand. The distance between granules in the contact regions is 0.8-2.0 times of the coating thickness. The mass ratio of the expanded perlite sand and the polyolefin is 88:12 respectively. The volume mass of the resulting porous heat-insulation material is 105 kg/m$^3$. The material has a high plasticity; its flexural strength [$\sigma_b$] is 3.1 kgf/cm$^2$. Compression strength [$\sigma_b$] of the material is 5.6 kgf/cm$^2$. The material is non-combustible. The thermal-conductivity coefficient of the material is low and equal to 0.036 kCal/m.hr.°C.

EXAMPLE 2

Expanded Perlite sand with a particle size of from 1,000 to 3,000$\mu$, an average granule diameter of 2,000$\mu$ and a volume mass of 50 kg/m$^3$ is preliminary dried at the temperature of 120° C. and charged into a reactor in the amount of 2 kg. The reactor is set under vacuum and vapours of vanadium tetrachloride (0.23 g) are admitted thereinto and deposited on the surface of granules of expanded perlite sand. Then the filler with vanadium chloride on its surface is transferred into a gas-phase polymerization reactor, wherein the temperature is maintained at 50° C. Into the same reactor vapours of triethylaluminium (0.58 g) are fed with a current of ethylene. The pressure of ethylene is 1.5 atm. The duration of the polymerization process is 5 minutes. The yield of polyethylene is 40 g.

The resulting product comprises granules of expanded perlites and coated with polyethylene. The coating thickness is 1/1000 of the average diameter of granules of expanded perlite sand.

Granules with the polymeric coating are charged into a mould and subjected to hot-compression moulding at the temperature of 100° C. under the pressure of 0.4 kg/cm$^2$. The time of residence under pressure is 60 minutes.

On completion of the moulding, the pressure is released, the mould is cooled to a temperature of 20°-30° C., and the resulting porous heat-insulation material is discharged from the mould in the form of a block moulded from granules of expanded perlite sand with polyethylene coating. The characteristics of the material are given in the Table hereinbelow.

EXAMPLE 3

Expanded perlite sand with a particle size of from 10 to 600 mcm, an average granule diameter of 250$\mu$ and the volume mass of 55 kg/m$^3$ is preliminarily dried at the temperature of 120° C. and charged in the reactor in the amount of 1.8 kg. Into the same reactor there are added 0.3 g of titanium tetrachloride in the vapour state in a current of an inert gas (nitrogen) with agitation of the filler. Then vapours of diethylaluminium chloride (0.67 g) are fed into the reactor in a current of an inert gas. Then the expanded perlite with the catalyst deposited on its surface is charged into a gas-phase polymerization reactor and ethylene is admitted thereinto to the pressure of 3 atm. The polymerization is conducted at the temperature of 80° C. for 25 minutes. The yield of polyethylene is 390 g.

The resulting product comprises granules of expanded perlite sand with polyethylene coating. The coating thickness is 1/30 of the average diameter of granules of the expanded perlite sand.

Granules with the polymer coating are charged into a mould and subjected to compression-moulding at the temperature of 150° C. under the pressure of 1 kgf/cm$^2$. The time of residence under pressure is 30 minutes.

On completion of the hot-compression moulding the pressure is released, the mould is cooled to 20°–30° C. and the resulting porous heat-insulation material in the form of blocks moulded from granules of expanded perlite sand with polyethylene coating is charged from the mould. The characteristics of the material are shown in the Table hereinbelow.

EXAMPLE 4

Expanded perlite sand with a particle size of from 50 to 500 mcm, the average granule diameter of 150μ/and the volume mass of 60 kg/m$^3$ is preliminarily dried at the temperature of 120° C. and charged into a reactor in the amount of 5 kg. Into the same reactor there are added vapours of vanadium tetrachloride (0.9 g) in a current of an inert gas. Then the expanded perlite sand with vanadium chloride deposited on its surface is charged into a gas-phase polymerization reactor. Then into the same reactor vapours of triisobutylaluminium are added /3.1 g/ in a current of propylene. The polymerization is conducted at the temperature of 70° C. under the pressure of 4 atm for 60 minutes. The yield of polypropylene is 880 g.

The resulting product comprises granules of expanded perlite sand with polypropylene coating. The coating thickness is 1/45 of the average diameter of granules of the expanded perlite sand.

Granules with the polymeric coating are charged into a mould and subjected to compression-moulding at the temperature of 200° C. under the pressure of 1.5 kgf/cm$^2$. The time of residence under pressure is 25 minutes.

On completion of the compression-moulding process, pressure is released, the mould is cooled to a temperature of 20° to 30° C. and the resulting porous heat-insulation material comprising a block moulded from granules of expanded perlite sand with propylene coating is dicharged from the mould. Characteristics of the final material are given in the Table hereinbelow.

EXAMPLE 5

Expanded perlite sand with a particle size of from 10 to 1,000μ, the average granule diameter of 100μ and the volume mass of 90 kg/m$^3$ is preliminarily dried at the temperature of 120° C. and charged into a reactor in the amount of 4 kg. The reactor is set under vacuum and vapours of vanadium tetrachloride in the amount of 0.38 g are added in a current of an inert gas under agitation of perlite sand. Then the expanded perlite sand with the compound of vanadium deposited thereon is charged into a gas-phase polymerization reactor. 1.1. g of triisobutylaluminium is added into the same reactor in the vapour state and then a mixture of ethylene and propylene (molar ratio between the monomers is 50:50) is admissed into the reactor to the pressure of 8 atm. Polymerization is conducted at the temperature of 90° C. under agitation for 1 hour. The yield of the polymer is 1 kg.

The resulting product comprises granules of expanded perlite sand with polymeric coating. The coating thickness is 1/25 of the average diameter of granules of the expanded perlite sand.

Granules with polymeric coating are charged into a mould and subjected to compression-moulding at the temperature of 180° C. under the pressure of 1 kgf/cm$^2$. The time of residence under pressure is 15 minutes.

On completion of the compression-moulding process, the pressure is released, the mould is cooled to a temperature of 20°–30° C. and the resulting porous heat-insulation material is discharged from the mould. The characteristics of the material are given in the Table hereinbelow.

EXAMPLE 6

Expanded vermiculite with a particle size of from 550 to 1,500μ, the average granule diameter of 600μ and the volume mass of 150 kg/m$^3$ is preliminarily dried at the temperature of 150° C. and charged into a reactor in the amount of 3.6 kg. Into the same reactor 0.51 g of titanium tetrachloride vapours is added in a current of an inert gas with agitation of the filler. Then vapours of triisobutylaluminium (1.4 g) are added into the reactor in a current of an inert gas. Then vermiculite with the catalyst deposited on its surface is charged into a gas-phase polymerization reactor and ethylene is admitted thereinto to the pressure of 2.1 atm. The polymerization is conducted at the temperature of 80° C. for 18 minutes. The yield of polyethylene is 440 g.

The resulting product comprises granules of expanded vermiculite coated with polyethylene. The coating thickness is equal to 1/50 of the average diameter of vermiculite granules.

Granules with polymeric coating are charged into a mould and subjected to compression-moulding at the temperature of 130° C. under the pressure of 5 kgf/cm$^2$. The time of residence under pressure is 15 minutes.

On completion of compression moulding, pressure is released, the mould is cooled to a temperature of from 20° to 30° C. and the resulting porous heat-insulation material comprising a block moulded from granules of expanded vermiculite with polyethylene coating is discharged from the mould. The characteristics of the resulting material are given in the Table hereinbelow.

EXAMPLE 7

Volcanic ash with a particle size of from 100 to 1,000μ with the average granule diameter of 300μ and the volume mass of 100 kg/m$^3$ is preliminarily dried at the temperature of 150° C. and charged into a reactor in the amount of 1.5 kg. Into the reactor vapours of vanadium tetrachloride are added in the amount of 0.2 g in a current of an inert gas with agitation of the filler. Then granules of the volcanic ash with vanadium chloride deposited thereon are placed into a gas-phase polymerization reactor, whereinto vapours of triisobutylaluminium in the amount of 0.65 g are added in a current of ethylene. The polymerization of ethylene is conducted at the temperature of 80° C. under the pressure of 5 atm for 5 minutes. The yield of polyethylene is 130 g.

The resulting product comprises granules of volcanic ash with polyethylene coating. The coating thickness is equal to 1/100 of the average diameter of the filler granules.

Granules with polyethylene coating are charged into a mould and subjected to hot-compression moulding at the temperature of 140° C. under the pressure of 1 kgf/cm$^2$. The time of residence under pressure is 40 minutes.

On completion of the moulding, the pressure is released, the mould is couled to a temperature of from 20° to 30° C. and the resulting porous heat-insulation material comprising a block moulded from granules of volcanic ash with polyethylene coating is discharged from the mould. The characteristics of the resulting material are given in the Table hereinbelow.

What is claimed is:

1. A porous heat-insulation material comprising blocks molded from granules of a porous mineral filler with a polyolefin coating, the coating having a thickness of from about 1/1000 to 1/25 of an average granule diameter; said granules being spaced apart from each other a distance of from about 0.5 to 2.0 times the coating thickness; and the mass ratio of said porous mineral filler to said polyolefin being from about 80–98:20–2, respectively.

2. A porous heat-insulation material as claimed in claim 1, wherein the porous mineral filler is selected from the group consisting of expanded perlite sand, expanded vermiculite and volcanic ash.

3. A porous heat-insulation material as claimed in claim 1, wherein the polyolefin is selected from the group consisting of polyethylene, polypropylene and a copolymer of ethylene and propylene.

* * * * *

TABLE

| Example No. | Thickness of the polymeric coating, | Distance between granules in contact regions | Mass ratio filler to polyolefine | Volume mass of the material, kg/m$^3$ | Flexural strength[$\sigma_b$], kgf/cm$^2$ | Compression strength [$\sigma_c$], kgf/cm$^2$ | Thermal conductivity coefficient, kCal/m.hr.°C. | Combustibility |
|---|---|---|---|---|---|---|---|---|
| 2 | 1/1000 of the average granule diameter | 1.4–2.0 of the coating thickness | 98:2 | 65 | 1.9 | 2.3 | 0.035 | non-combustible |
| 3 | 1/30 | 1.0–2.0 | 82:18 | 80 | 3.4 | 8.0 | 0.032 | low-combustible |
| 4 | 1/45 | 0.6–2.0 | 85:15 | 120 | 3.2 | 6.9 | 0.036 | low-combustible |
| 5 | 1/25 | 0.5–1.5 | 80:20 | 150 | 3.9 | 8.7 | 0.039 | low-combustible |
| 6 | 1/50 | 0.5–2.0 | 89:11 | 250 | 4.5 | 12.0 | 0.041 | non-combustible |
| 7 | 1/100 | 0.5–1.5 | 92:8 | 150 | 2.4 | 4.3 | 0.04 | non-combustible |